(12) United States Patent
Lomont et al.

(10) Patent No.: US 8,646,082 B2
(45) Date of Patent: Feb. 4, 2014

(54) USB FIREWALL APPARATUS AND METHOD

(75) Inventors: Chris C. Lomont, Ann Arbor, MI (US); Charles J. Jacobus, Ann Arbor, MI (US)

(73) Assignee: Cybernet Systems Corporation, Ann Arbor, MI (US)

( * ) Notice: Subject to any disclaimer, the term of this patent is extended or adjusted under 35 U.S.C. 154(b) by 0 days.

(21) Appl. No.: 13/423,977

(22) Filed: Mar. 19, 2012

(65) Prior Publication Data

US 2012/0240234 A1 Sep. 20, 2012

Related U.S. Application Data

(60) Provisional application No. 61/453,777, filed on Mar. 17, 2011.

(51) Int. Cl.
*G06F 12/14* (2006.01)
(52) U.S. Cl.
USPC .......................................................... 726/24
(58) Field of Classification Search
USPC ............................... 726/22–24; 713/150–181
See application file for complete search history.

(56) References Cited

U.S. PATENT DOCUMENTS

| | | | |
|---|---|---|---|
| 6,820,160 B1 * | 11/2004 | Allman | 710/305 |
| 6,879,869 B2 | 4/2005 | Kou | |
| 7,213,766 B2 | 5/2007 | Ryan et al. | |
| 7,367,832 B2 | 5/2008 | Muhs et al. | |
| 8,019,194 B2 | 9/2011 | Morrison et al. | |
| 8,037,247 B2 | 10/2011 | Kreiner et al. | |
| 8,118,606 B2 | 2/2012 | Larsson | |
| 8,286,243 B2 * | 10/2012 | Clark et al. | 726/23 |
| 2004/0193302 A1 | 9/2004 | Kou | |
| 2005/0109841 A1 | 5/2005 | Ryan et al. | |
| 2005/0254776 A1 | 11/2005 | Morrison et al. | |
| 2006/0075486 A1 | 4/2006 | Lin et al. | |
| 2007/0105432 A1 | 5/2007 | Muhs et al. | |
| 2008/0040609 A1 | 2/2008 | Giobbi | |
| 2008/0083037 A1 | 4/2008 | Kruse et al. | |
| 2008/0156207 A1 | 7/2008 | Ellenbogen | |
| 2008/0222309 A1 * | 9/2008 | Shanbhogue | 709/250 |
| 2008/0250165 A1 * | 10/2008 | Reynolds et al. | 710/17 |
| 2009/0024746 A1 * | 1/2009 | Welch | 709/228 |
| 2009/0150435 A1 | 6/2009 | Balu et al. | |
| 2010/0037296 A1 | 2/2010 | Silverstone | |
| 2010/0087076 A1 | 4/2010 | Larsson | |
| 2010/0153621 A1 | 6/2010 | Kreiner et al. | |
| 2010/0281546 A1 | 11/2010 | Kruse et al. | |
| 2010/0324956 A1 | 12/2010 | Lopez et al. | |

(Continued)

*Primary Examiner* — Tonia L Dollinger
*Assistant Examiner* — Davoud Zand
(74) *Attorney, Agent, or Firm* — Gifford, Krass, Sprinkle, Anderson & Citkowski, P.C.

(57) ABSTRACT

Apparatus and methods prevent malicious data in Universal Serial Bus (USB) configurations by providing a hardware firewall. A hardware device interconnected between a host and the USB monitors communication packets and blocks packets having unwanted or malicious intent. The device may act as a hub, enabling multiple devices to connect to a single host. The device may only allow mass storage packets from a device recognized as a mass storage device. The device may block enumeration of unwanted devices by not forwarding packets between the device and the host. The device may be operative to assign a bogus address to a malicious device so as not to transfer communications from the device further up the chain to the host. The device may provide shallow or deep packet inspection to determine when a trusted device is sending possible malicious data, or provide packet validation to block packets that are malformed.

2 Claims, 2 Drawing Sheets

SD storage card
Forensics, Logging, Settings

(56) References Cited

U.S. PATENT DOCUMENTS

| | | |
|---|---|---|
| 2010/0332355 A1 | 12/2010 | Lopez et al. |
| 2010/0333192 A1 | 12/2010 | Song |
| 2011/0030030 A1* | 2/2011 | Terpening et al. ............. 726/1 |
| 2011/0166824 A1 | 7/2011 | Haisty et al. |
| 2011/0169924 A1 | 7/2011 | Haisty et al. |
| 2011/0215917 A1 | 9/2011 | Bolduc et al. |
| 2011/0296488 A1* | 12/2011 | Dandekar et al. ............. 726/1 |
| 2012/0020638 A1 | 1/2012 | Morrison et al. |
| 2012/0079563 A1 | 3/2012 | Green et al. |

* cited by examiner

USB FIREWALL APPARATUS AND METHOD

REFERENCE TO RELATED APPLICATION

This application claims priority from U.S. Provisional Patent Application Ser. No. 61/453,777, filed Mar. 17, 2011, the entire content of which is incorporated herein by reference.

FIELD OF THE INVENTION

This invention relates generally to computer security and, in particular, to apparatus and methods that prevent malicious data in Universal Serial Bus (USB) configurations by providing a hardware firewall.

BACKGROUND OF THE INVENTION

The Universal Serial Bus (USB) is a common interconnect format for computer devices. Data is transmitted over a serial connection between a host and a device. Each device is assigned an address form 0-127, allowing multiple devices to communicate with the same host using the same wires.

The USB specification allows multiple device classes, including but not limited to keyboards, mice, printers, mass storage, video, and vendor specific items. Some physical devices appear as two or more logical USB devices, such as a webcam that has an audio and a video USB connection. USB data is sent in packets, some of which signal devices being added or removed. Other packet types are data, signaling such as acknowledgement of data received or ready, and other types.

Malicious USB devices have been created that utilize weaknesses in the USB infrastructure to attack unprotected hosts and devices through combinations of malformed packets, device spoofing, electrical tricks, and other methods. For example, a flash drive may have a keyboard controller hidden in it that only activates after the drive has been inserted for some length of time. The keyboard activates, unsuspecting USB infrastructure connects it to the PC, and the keyboard sends commands for malicious activity on the host PC. There are many other types of attacks.

SUMMARY OF THE INVENTION

This invention is directed to apparatus and methods that prevent malicious data in Universal Serial Bus (USB) configurations by providing a hardware firewall. A computer security device according to the invention comprises a hardware unit interconnected between a Universal Serial Bus (USB) device and a host. The device, which may include a memory to log data exchanges, monitors communication packets associated with data exchanges between the bus and the host and blocks packets having unwanted or malicious intent.

In some embodiments, the device may only allow mass storage packets from a device recognized as a mass storage device. The device may block enumeration of unwanted devices by not forwarding packets between the device and the host. The device may be operative to assign a bogus address to a malicious device so as not to transfer communications from the device further up the chain to the host. The device may provide shallow or deep packet inspection to determine when a trusted device is sending possible malicious data, or provide packet validation to block packets that are malformed.

In the preferred embodiment, the device acts as a hub, enabling multiple devices to connect to a single host. The device may interface to the host through a first USB connector, and interface to the USB through a second USB connector. For added security, the device may be interfaced to the host through an optically isolated bus. Methods of use are also disclosed and claimed herein.

DETAILED DESCRIPTION OF THE INVENTION

This invention prevents malicious data in USB configurations by providing a hardware firewall. All USB data is sent between a device and a host. The firewall sites physically between them, either acting as a hub (which connects multiple devices to a single host) or acting passively by sitting on the wire to listen to traffic. In the latter case it does not change traffic but nevertheless monitors and logs data.

Figure 1:
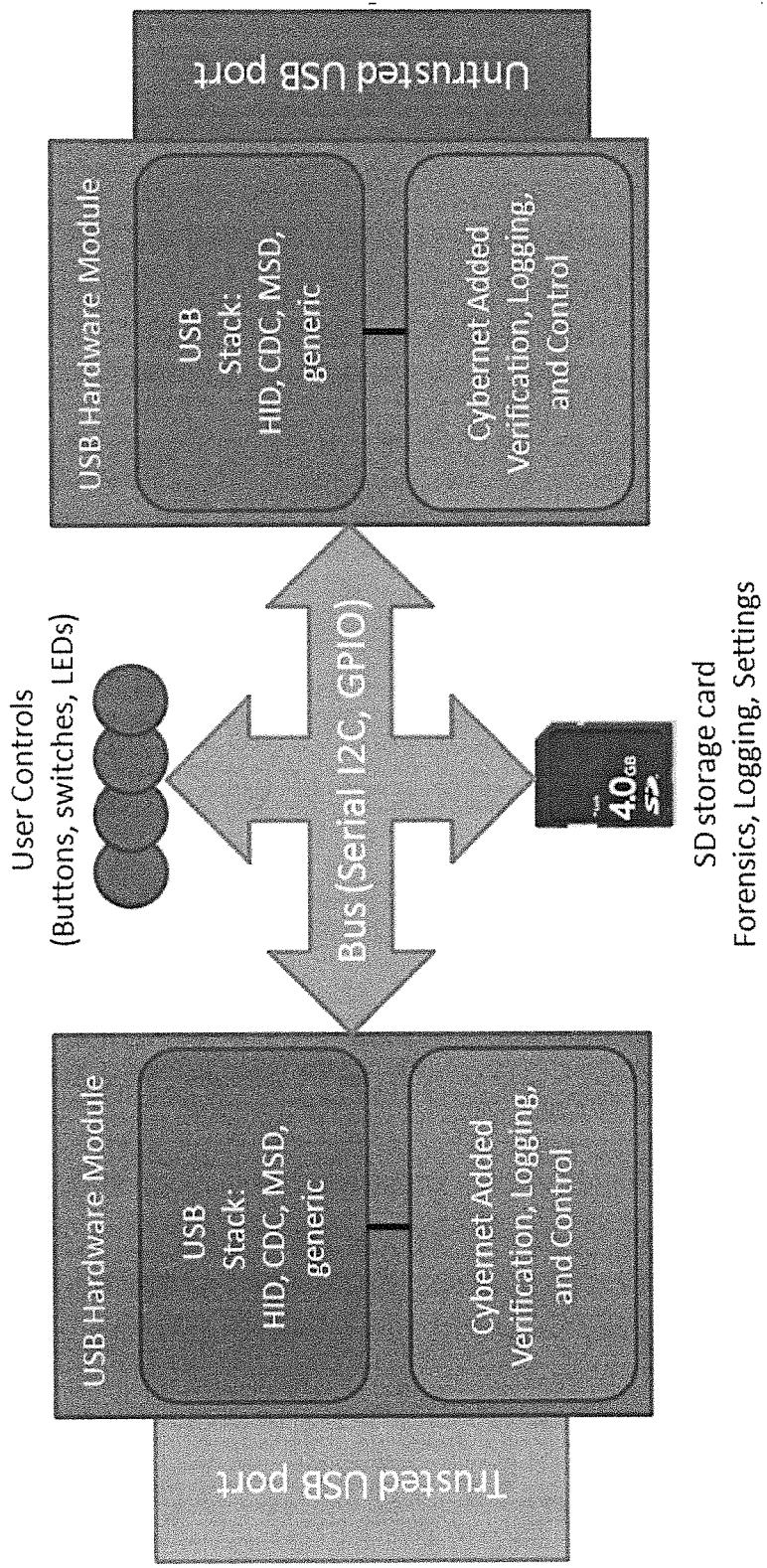
FIG. 1 is a block diagram of a USB firewall device constructed in accordance with the present invention.

The firewall, depicted schematically in FIG. 1 includes a hardware monitor that sits between two communicating USB endpoints and monitors USB data. The device stops communication packets it deems are not wanted by the user or that have malicious intent. For example, a user could set the hardware to only allow mass storage packets from a device that should only be mass storage.

The firewall can stop malicious device types by monitoring the USB pipes (connections between device and host) and watching for new connection enumeration. When a new device tries to connect to the system, the host enumerates the device by first noticing changes on the bus, then performing transfers that obtain the device information. The device responds to the host through a specified endpoint which the device can monitor.

The firewall can block enumeration of devices that are not allowed to pass the firewall by not forwarding packets between the device to the host. The firewall assigns an address to the malicious device and makes the device think it was on a valid host, but would not transfer the communication further up the chain to the host.

Figure 2:
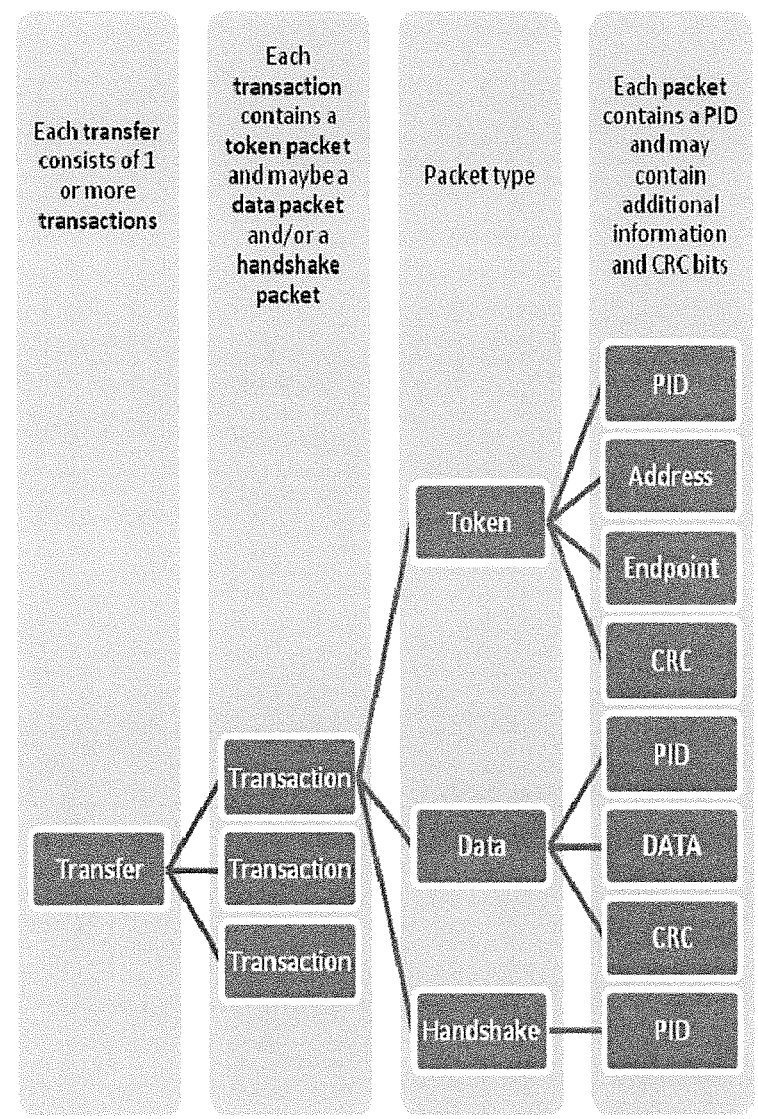
FIG. 2 illustrates transfer between the device and a host, which are broken into transactions, and which are further broken into packets.

Interactions between device and host are carried out through transfers, which are broken into transactions, which are further broken into packets (FIG. 2). Each packet has components detailing which device the packet refers to. Using this addressing, the firewall could assign addresses to devices it wants to block and other addresses to devices that are cleared to pass through, and the firewall would sort communication based on device address. This allows filtering communication by device on the untrusted side of the firewall.

For packets that are allowed through, the device provides shallow or deep packet inspection to determine when a trusted device is sending possible malicious data. One example would be to detect file transfers from mass storage devices and examine the files as they pass through. Another example detects images coming from a camera and scans the image headers for valid parameters.

This device can also provide a level of validation on the packets to ensure they are not malformed. Malformed packets can be designed to exploit weaknesses or errors in USB implementations, such as buffer overflows. For example, checking that fields in packets are correctly formed gives a second layer of protection against poorly implemented hardware that may be susceptible to invalid fields or invalid combinations of fields.

This device can electrically isolate the two connections to prevent electrical attacks, for example by using an optically isolated bus.

The invention claimed is:

1. A computer security device, comprising:
 a hardware unit interconnected between a host and a particular Universal Serial Bus (USB) device having an expected behavior, the unit including a bus controller interfaced to a memory; and wherein the controller is operative to:
 (a) monitor communication packets associated with data exchanges between the bus and the host,
 (b) log the data exchanges in the memory, and
 (c) block unwanted or malicious communication packets from reaching the host if the logged data exchanges are indicative of behavior outside of the expected behavior associated with the particular USB device; and
 wherein the unit is operative to assign a bogus address to a malicious device so as not to transfer communications from the device further up the chain to the host.

2. A method protecting a computer from network attacks, comprising the steps of:
 monitoring and logging communication packets associated with data exchanges between a host and a particular Universal Serial Bus (USB) device to which the host is connected, the particular USB device having a known behavior;
 determining if the communication packets include data outside of the known behavior of the USB device, in which case the packets are considered unwanted or have malicious intent; and, if so:
 blocking those packets from reaching the host; and
 assigning a bogus address to a malicious device so as not to transfer communications from the device further up the chain to the host.

* * * * *